United States Patent [19]

Roth et al.

[11] 4,076,868
[45] Feb. 28, 1978

[54] RENDERING BUILDING MATERIALS HYDROPHOBIC

[75] Inventors: Michael Roth; Erhard Bosch, both of Burghausen, Germany

[73] Assignee: Wacker-Chemie GmbH, Munich, Germany

[21] Appl. No.: 681,354

[22] Filed: Apr. 29, 1976

Related U.S. Application Data

[63] Continuation of Ser. No. 522,660, Nov. 11, 1974, abandoned.

[30] Foreign Application Priority Data

Nov. 9, 1973 Germany .............................. 2356142

[51] Int. Cl.$^2$ ......................... B05D 3/12; B32B 13/12
[52] U.S. Cl. ...................................... 427/348; 134/2; 134/4; 427/368; 427/387
[58] Field of Search ....................... 427/387, 368, 348; 428/321, 454, 447; 134/2, 4

[56] References Cited

U.S. PATENT DOCUMENTS

| | | | |
|---|---|---|---|
| 1,506,472 | 8/1924 | Wuertz | 427/368 X |
| 3,579,540 | 5/1971 | Ohlhausen | 260/375 B |
| 3,622,529 | 11/1971 | Evans | 260/375 B |
| 3,629,183 | 12/1971 | Proriol | 260/375 B |
| 3,644,434 | 2/1972 | Hittmair et al. | 260/375 B |
| 3,647,725 | 3/1972 | Nitzsche et al. | 260/375 B |

OTHER PUBLICATIONS

Noll, *Chemistry and Technology of Silicones,* pp. 400–403, (1968).

*Primary Examiner*—Harry J. Gwinnell

[57] ABSTRACT

A process for simultaneously cleaning and rendering building materials hydrophobic which comprises applying to the surface of the building material a solution of a hydrophobic agent having admixed therewith a filler having a surface area of at least 50 mg$^2$/g and after evaporation of the solvent, removing the filler residue.

15 Claims, No Drawings

RENDERING BUILDING MATERIALS HYDROPHOBIC

This is a continuation of application Ser. No. 522,660, filed Nov. 11, 1974, now abandoned.

This invention relates to a process for rendering building materials hydrophobic.

There are two basic types of processes for rendering building materials hydrophobic. In one type of process, the compound imparting hydrophobic properties to the building material (hereinafter called the hydrophobic agent) is mixed into the building material, e.g. cement, before shaping and hardening. In the other type of process, the hydrophobic agent is applied to the surface of the building material after shaping and hardening to at least an advanced degree, which may take place with either hydraulically or non-hydraulically hardening building materials, or, for example, natural marble; the hydrophobic agent may be applied, for example, to a facade.

The present invention is concerned with processes of the latter type, in which the hydrophobic agent is applied to the surface of the building material in the form of a solution. Such processes have previously been described in, for example, E. G. Grunau, *Facsade und Wasserhaushalt der Wand*, Cologne-Braunsfeld 1967, page 42. They have the advantage over processes in which the hydrophobic agent is applied in the form of aqueous or organic emulsions or suspensions, that there is no, or considerably less, demixing (as may occur on the surface of the building material due to breaking of the emulsion or suspension). This means that the hydrophobic agent can penetrate more deeply into the building material with the result that a longer-lasting repellency of liquid water is obtained while the water vapour permeability of the building material is maintained. Organosilicon compounds are particularly suitable hydrophobic agents; solutions of these compounds in organic solvents have the advantage that they can be applied to building materials that have previously been treated with such compounds.

In present processes for rendering building materials hydrophobic, it is often necessary to clean the surface of the building material, with, for example, water vapour or acid, or by sandblast, prior to treating it with the hydrophobic agent. This is particularly so when the building material has been exposed to the atmosphere for some time and thus has been rendered dirty by, for example, dust or waste gases. Building materials that have been cleaned with aqueous cleaning agents have to be left to dry before hydrophobic agents in organic solution can be applied.

In order to achieve a sufficiently great penetration depth with presently used hydrophobic agent solutions it is often necessary to apply several coatings of the solution, which makes the process more expensive. A further disadvantage of using present solutions, emulsions, and suspensions, is that because of their great mobility it is often difficult to prevent the agent spreading onto places, such as windows and doors, where it is not intended to be applied.

The present invention provides a process for rendering building materials hydrophobic by the application of solutions of hydrophobic agents, particularly organosilicon compounds, wherein the solutions are applied to the surfaces of the building materials in a form thickened by fillers having a surface area of at least 50 m²/g, and wherein any residue of filler is removed from the said surface after evaporation of the solvent.

It has been found that this process has the advantage over previous processes that the application of the hydrophobic solution simultaneously cleans the surface of the building material, thus rendering any previous cleaning step superfluous and saving the expense of such a step. A greater penetration depth is achieved using the present process, which saves the expense of repeated application of the hydrophobic solution. A further advantage of this process is that the solutions are not so mobile as the previously used solutions and that it is easier to avoid the solution running onto areas where it is not intended to be applied.

The hydrophobic agents used according to the present invention may be the same as those previously used for application to building materials in the form of solutions. Organosilicon compounds are preferably used for this purpose because they give a particularly high degree of water-repellency. Preferred organosilicon compounds are organopolysiloxanes consisting essentially of units of the general formula $$R_nH_mSiO_{(4-m-n)/2}$$

in which R denotes an optionally halogenated alkyl or aryl group having up to 18 carbon atoms, $n$ denotes 0, 1, 2, or 3, and $m$ denotes 0 or 1. In the polysiloxane, the average value of $n$ should be from 0.9 to 1.8 and the averge value of $m$ should be from 0.0 to 1.0, and $n$ should denote 1 in at least 50% of the number of units. Preferably, $n$ should be 2 or 3 in not more than 30 mole % of the units; the preferred viscosity of these organopolysiloxanes is not more than 1000 cSt, measured at 25° C in a 50% by weight solution in toluene. Other preferred organosilicon compounds are silanes of the general formula $$R_nSiX_{4-n}$$

in which R and $n$ are defined as above and X denotes a hydrolysable atom or group. The partial hydrolysates, soluble in organic solvents, of these silanes are also preferred organosilicon compounds. All these compounds are preferred because they are easily obtainable.

The radicals denoted by R in the above formulae may be alkyl radicals, for example, methyl, ethyl, propyl, isopropyl, and octadecyl radicals, or halogenated alkyl radicals, for example an α,α,α-trifluoropropyl radical. Alternatively, R may denote an aryl radical, the most important example of which is a phenyl radical, or a halogenated aryl radical, for example a n-chlorophenyl radical. Because they are more easily obtained, at least 50% of the number of radicals R are preferably methyl radicals, any remaining radicals R preferably being phenyl radicals.

Further preferred organosilicon compounds are alkali metal hydrocarbon siliconates, which are preferably monomeric compounds of the general formula $$R'Si(OH)_2OM$$

or polymeric compounds comprising units of the general formula $$R'SiO(OM)$$

in which formulae R' denotes a monovalent aliphatic hydrocarbon radical having up to 5 carbon atoms or a phenyl radical, and M denotes an alkali metal atom. An n-propyl radical is particularly preferred as the radical R' because of its high alkali resistance. Other suitable aliphatic hydrocarbon radicals R' are other alkyl radicals, for example, methyl, ethyl, isopropyl, n-butyl, sec-butyl, and amyl radicals, and alkenyl radicals, for example vinyl radicals. The alkali metal atom M may be a lithium, sodium, potassium, rubidium, or caesium atom, but sodium and potassium atoms are preferred because they are more easily obtained.

The above-mentioned organosilicon compounds are preferred because they are all fairly readily obtainable. Mixtures of different organopolysiloxanes and/or organosilanes, or of different alkali metal organosiliconates can be used.

Other hydrophobic agents that can be used in the present process are, for example, organic resins, e.g. polymethacrylates, polyacrylates, vinyl chloride copolymers soluble in organic solvents (particularly lacquer solvents), epoxy resins, unsaturated alkali-resistant polyester resins, highly chlorinated polyolefins, and chlorinated rubber. Saturated aliphatic hydrocarbons having a boiling point of at least 360° C at 760 mm Hg can also be used as hydrophobic agents. Hydrophobic agents that are not organosilicon compounds can, if desired, be used in admixture with organosilicon compounds.

The solvents used according to the invention may be the same as those previously used for the application of hydrophobic agents in solution to the surfaces of building materials. The actual solvent used will of course depend on the solubility of the particular hydrophobic agent. The solvent may be water, an organic solvent (either water-immiscible or water-miscible), or a mixture of water and a water-miscible organic solvent. Examples of suitable water-miscible solvents are alcohols, e.g. methanol, ethanol, n-propanol, and isopropanol, and ketones, e.g. acetone, and methyl ethyl ketone.

Water and mixtures of water and solvents are primarily used with alkali metal organosiliconates, whereas organic solvents substantially free of water are used primarily with other organosilicon compounds and with hydrophobic agents other than organosilicon compounds. Examples of organic solvents suitable for use with the organopolysiloxanes and silanes mentioned above and with hydrophobic agents other than organosilicon compounds are alkanes having boiling points in the range of from 120° to 180° C at 760 mm Hg; aromatic hydrocarbons, e.g. toluene, xylenes, and trimethylbenzenes; chlorohydrocarbons, e.g. trichloroethylene; alcohols, e.g. ethanol, isopropanol, and diacetone alcohol; ketones, e.g. acetone, methyl ethyl ketone, and cyclohexanone; and esters, e.g. ethyl acetate. Mixtures of organic solvents can be used.

In order to achieve good penetration, of the hydrophobic solutions into the building materials even at relatively high air temperatures, it is advantageous to use a solvent that does not evaporate too quickly, that is to say one that evaporates at least five times more slowly than diethyl ether. Moreover, if the building material is moist with water, it is advantageous to use a water-miscible solvent, either as the solvent or as a component of the solvent, in order to achieve better penetration.

The amount of hydrophobic agent used should advantageously be at least 0.2% by weight, relative to the total weight of solvent and hydrophobic agent, in order to give a sufficiently high degree of water-repellency. Moreover, advantageously the amount of hydrophobic agent should not exceed 50% by weight, relative to the weight of solvent and hydrophobic agent, first because it is preferred that the hydrophobic agent should achieve its effect not by the formation of a film on the surface of the building material but by causing an increase in the surface tension of water, and secondly because it is preferred that the coating or residue of filler remaining on the surface of the building material after evaporation of the solvent should not, or should only loosely, adhere to the building material so that it may fairly easily be removed. It is found that the best results are generally obtained using from 5 to 20% by weight of the hydrophobic agent, relative to the total weight of solvent and hydrophobic agent.

The fillers used according to the invention have a surface area of at least 50 $m^2/g$, as determined by the nitrogen adsorption method described in ASTM Technical Bulletin No. 51, 1941, pages 95 ff., generally known as the BET method. They are preferably colourless in order to avoid undesired colouring of the building material. Advantageously the fillers should be present in the hydrophobic solutions as a visible suspension, that is to say they should not be colloidally soluble in the water or organic solvent, otherwise their removal from the building material is more difficult. Suitable fillers, satisfying these requirements, are, for example, various forms of silicon dioxide, for example, pyrogenically produced silicon dioxide (fume silica), silicon dioxide aerogels (that is silicon dioxide hydrogels that have been dehydrated while retaining their structure), precipitated silicon dioxide; and pyrogenically produced titanium dioxide. Mixtures of fillers can be used.

The fillers used according to the invention, and fillers having a surface area of less than 50 $m^2/g$ which may conjointly be used as described below, are advantageously 'coated', that is to say that the fillers may carry organic or silicon-organic compounds adhering, and generally chemically bonded, to their surface, or may contain organic or silicon-organic groups, especially organosiloxy groups, e.g. trimethylsiloxy or dimethylsiloxy groups. Fillers of this kind may be produced, for example, by reacting pyrogenically produced silicon dioxide with organosilicon compounds, e.g. trimethylethoxysilane; this reaction may be carried out in a grinding device, for example a ball mill or edge runner, as described in German Offenlegungsschrift No. 2,211,377.

The filler is admixed with the solution of the hydrophobic agent prior to application of said solution to the surface of the building material. In order that the solutions shall be in a suitable thickened form, that is preferably in the form of pastes or spreadable liquids, in order that the water-repellent effect is obtained by an increase in the surface tension of water and not by film formation, and in order that the filler may be easily removed from the building material after evaporation of the solvent, the amount of filler used should preferably be at least 1% by weight, relative to the total weight of solvent and hydrophobic agent. On the other hand, in order to achieve a good degree of water repellency, the amount of filler should preferably not exceed 25% by weight, relative to the total weight of solvent and hydrophobic agent. It has been found that the best results are generally obtained when using from 5 to 15% by weight of fillers, relative to the total weight of solvent and hydrophobic agent.

In addition to being admixed with the fillers, the hydrophobic solutions can be admixed with various auxiliary substances, for example, agents for increasing the alkali resistance, agents for increasing the water repellency, hardening catalysts for organosilicon compounds, agents for increasing the effectiveness of the hydrophobic agents (e.g. metal compounds, e.g. aluminium stearate, aluminium alcoholates, zirconium compounds, zinc octoate, and titanium alcoholates), and fillers having a surface area of less than 50 m²/g (e.g. diatomaceous earth), and pigments (e.g. iron oxide).

The amount of hydrophobic solutions incorporating fillers applied to the surface of the building material is from 0.1 to 2.0 kg, more preferably from 0.4 to 0.7 kg, of these spreadable liquids or pastes per m² of the surface of the building material.

Building materials that can be rendered water-repellent by the present process are those that could be rendered water-repellent by previous processes in which a hydrophobic agent was applied to the building material in the form of a solution. The present process is of particular importance for the treatment of glazed ceramic tiles, and of the exposed surfaces of sand and lime mortar or sand and cement mortar as used in mortar joints of walls built of bricks or built of natural and/or synthetic stones. The process can also be used for the treatment of, for example, plaster, that is wall coatings based on a mixture of sand and hydraulically or non-hydraulically binding inorganic materials, e.g. lime, cement, and gypsum. Walls and other structures of concrete, slag stones, calciferous sandstones, or asbestos cement, are further examples of building materials that can be treated by the present process.

The hydrophobic solutions incorporating the fillers can be applied to the surfaces of the building materials in any desired manner suitable for the application of pastes or spreadable liquids, for example by spreading, spraying, or trowelling. When the hydrophobic solutions incorporating the fillers have been applied and the solvent has evaporated, the filler remains on the surface of the building material. This filler may loosely adhere to the building material forming a coating, or most of it may fall off if the surface is perpendicular or at an angle of more than 45° to the horizontal. It may, however, easily be removed either by brushing it off or by blowing it off with compressed air.

The following Examples and Comparison Example were carried out to illustrate the present process and to compare it with a previously known process.

Glazed ceramic tiles were fixed by means of cement mortar onto concrete slabs of size 50 cm × 50 cm × 10 cm, and the joints were filled with cement mortar. The slabs were then exposed to weathering for seven months during which time, dirt settled on the joints and on the tiles.

Various solutions consisting of (a) 2 parts by weight of an organopolysiloxane consisting essentially of monomethylsiloxane units and a few dimethylsiloxane units, having the average unit formula $(CH_3)_{1.10}Si(OC_2H_5)_{0.02}(OH)_{0.04}O_{1.92}$ and having a viscosity of 40 to 60 cSt at 25° C measured in a 50% by weight toluene solution (12 secs in the DIN cup with an aperture of 4 mm), (b) 2 parts by weight of an organopolysiloxane resin consisting of $C_6H_5SiO_{3/2}$, $CH_3SiO_{3/2}$, and $(CH_3)_2SiO$ units in a molar ratio of 1:1:1, having a viscosity of 110 cSt at 25° C (measured as above), and (c) 1 part by weight of aluminium stearate, in (d) 95 parts by weight of toluene, thickened with (e) various fillers as stated in the following Table (except in the case of the Comparison Example where no filler was used), were subsequently applied to the tiles and joints in a thickness of from 2 to 3 mm by means of a brush. The solutions were left to dry, and with the slabs in an inclined position, the majority of the filler fell off the surface after evaporation of the solvent; the remainder of the filler was brushed off.

The dirt deposited during weathering was found to have been removed in the case of the slabs treated with the thickened solutions, but not in the case of that treated with the unthickened solution. The penetration depth of the hydrophobic agent was determined by breaking open the treated slabs and applying water to the fracture surface : the surface remained light as far as the hydrophobic agent had penetrated, but the remainder of the surface was darkened with the water. The results are shown in the Table.

Table

| Filler | | Surface area (m²/g) | Parts by weight of filler | Penetration depth (mm) |
|---|---|---|---|---|
| None | | — | — | 1-2 |
| (a) | Silicon dioxide produced pyrogonically in the gas phase | 130 | 15 | 3-4 |
| (b) | As (a), but containing trimethylsiloxy groups on the surface | 130 | 15 | 5 |
| (c) | As (b) | 300 | 15 | 7 |
| (d) | Precipitated silicic acid | more than 50 | 10 | 2-3 |

The silicon dioxide produced pyrogenically in the gas phase and containing trimethylsiloxy groups on the surface was obtained by mixing 10 kg of silicon dioxide produced pyrogenically in the gaseous phase with 2.5 kg of trimethylethoxysilane and storing for 5 days in a closed polyethylene bag at room temperature.

What we claim is:

1. A process for simultaneously cleaning and rendering a preformed building material hydrophobic, which comprises (1) applying to the surface of the building material selected from the group consisting of concrete, bricks, glazed ceramic tiles and plaster, a composition consisting essentially of a hydrophobic agent selected from the group consisting of organopolysiloxanes having siloxane units of the general formula $R_nH_mSiO_{(4-m-n)/2}$, silanes of the formula $R_nSiX_{4-n}$ and partial hydrolysates thereof, alkali metal hydrocarbon siliconates of the formula $R'Si(OH)_2OM$ and polymers having units of the formula $R'SiO(OM)$ and mixtures thereof, wherein R is selected from the group consisting of alkyl and aryl radicals having up to 18 carbon atoms, R' is selected from the group consisting of a monovalent hydrocarbon radical having up to 5 carbon atoms and a phenyl radical, M represents an alkali metal atom, X represents a hydrolyzable radical, $n$ denotes 0, 1, 2, or 3 and $m$ denotes 0 or 1, and in the polysiloxane the average value of the $n$ is from 0.9 to 1.8, and $n$ is 1 in at least 50 percent of the number of siloxane units, a solvent for the hydrophobic agent in which the hydrophobic agent is present in an amount of from 0.2 to 50 percent by weight based on the weight of the hydrophobic agent and solvent and a residue forming filler having a surface area of at least 50 m²/g, in an amount of from 1 to 25 percent by weight based on the total weight of the hydrophobic agent and solvent, (2) removing the solvent by evaporation to form a filler residue on the surface of said building material and thereafter (3) removing the filler residue from said surface to simultaneously clean and render said building material hydrophobic.

2. The process as claimed in claim 1, wherein $n$ represents 2 or 3 in up to 30 mole percent of the units of the given organopolysiloxane formula.

3. The process as claimed in claim 1, wherein the organopolysiloxane has a viscosity up to 1000 cSt, measured at 25° C. in a 50 percent by weight solution in toluene.

4. A process for simultaneously cleaning and rendering a preformed building material hydrophobic, which comprises (1) applying to the surface of the building material selected from the group consisting of concrete, bricks, glazed ceramic tiles and plaster, a composition consisting essentially of a hydrophobic agent selected from the group consisting of polymethacrylates, polyacrylates, epoxy resins, unsaturated alkali resistant polyester resins, chlorinated polyolefins, chlorinated rubber, vinyl chloride copolymers soluble in organic solvents and a saturated aliphatic hydrocarbon having a boiling point of at least 360° C at 760 mm Hg, a solvent for the hydrophobic agent in which the hydrophobic agent is present in an amount of from 0.2 to 50 percent by weight based on the weight of the hydrophobic agent and solvent and a filler having a surface area of at least 50 m²/g, in an amount of from 1 to 25 percent by weight based on the total weight of the hydrophobic agent and solvent, (2) removing the solvent by evaporation to form a filler residue on the surface of said building material and thereafter (3) removing the filler residue from said surface to simultaneously clean and render said building material hydrophobic.

5. The process as claimed in claim 1, wherein the solvent for the hydrophobic agent is selected from the group consisting of water, an organic solvent, and a mixture of water and a water-miscible organic solvent.

6. The process as claimed in claim 1, wherein the solvent for the hydrophobic agent is an organic solvent substantially free of water.

7. The process as claimed in claim 5, wherein the water-miscible organic solvent is an alcohol.

8. The process as claimed in claim 6, wherein the organic solvent is selected from the group consisting of an alkane having a boiling point in the range of from 120° C. to 180° C. at 760 mm Hg, an aromatic hydrocarbon, a chlorohydrocarbon, an alcohol, a ketone, and an ester.

9. The process as claimed in claim 1, wherein the amount of hydrophobic agent is from 5 to 20 percent by weight, based on the total weight of hydrophobic agent and solvent.

10. The process as claimed in claim 1, wherein the mixture of the filler and the hydrophobic solution is a visible suspension.

11. The process as claimed in claim 1, wherein the filler is silicon dioxide.

12. The process as claimed in claim 1, wherein the filler contains on its surface chemically bonded organosiloxy groups.

13. The process as claimed in claim 1, wherein the amount of filler is from 5 to 15 percent by weight based on the total weight of hydrophobic agent and solvent.

14. The process as claimed in claim 1, wherein the composition containing the hydrophobic agent, solvent and filler is applied to the surface of the building material in an amount of from 0.1 to 2.0 kg/m².

15. The process as claimed in claim 1, wherein the composition containing the hydrophobic agent, solvent and filler is applied to the surface of the building material in an amount of from 0.4 to 0.7 kg/m².

* * * * *